Jan. 8, 1957    R. W. BROWN    2,776,561
APPARATUS FOR TESTING SPRINGS
Filed Aug. 6, 1953
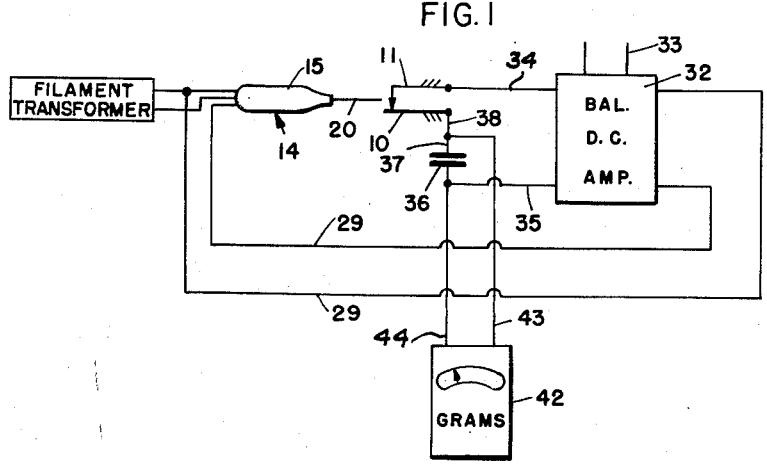
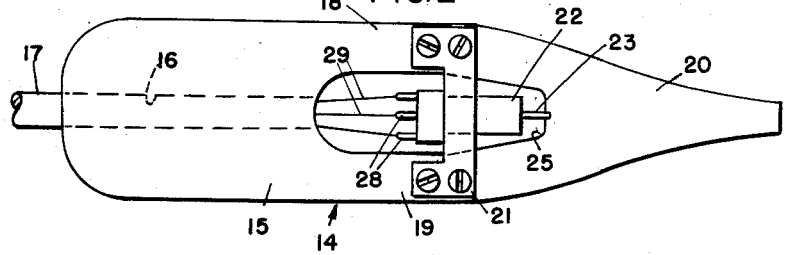
*INVENTOR:*
R. W. BROWN
BY
C. B. Hamilton
ATT'Y United States Patent Office 2,776,561
Patented Jan. 8, 1957

2,776,561
APPARATUS FOR TESTING SPRINGS

Raymond W. Brown, Evergreen Park, Ill., assignor to Western Electric Company, Incorporated, New York, N. Y., a corporation of New York Application August 6, 1953, Serial No. 372,636

2 Claims. (Cl. 73—141)

This invention relates to apparatus for testing springs, and has for an object thereof the provision of new and improved apparatus for testing springs.

Another object of the invention is to provide new and improved apparatus for testing leaf springs.

A further object of the invention is to provide apparatus for testing electrical contacts as the contacts are actuated.

Apparatus illustrating certain features of the invention may include transducer means for engaging a spring and deflecting it. The transducer means may be applied to the spring with a predetermined force, and actuates electrical indicating means to show the deflection of the spring from that force.

A complete understanding of the invention may be obtained from the following detailed description of apparatus forming a specific embodiment thereof, when read in conjunction with the appended drawings, in which Fig. 1 is a diagrammatic view of an apparatus forming one embodiment of the invention, and Fig. 2 is a top plan view of a portion of the apparatus shown in Fig. 1.

Referring now in detail to the drawings, there is shown in Figs. 1 and 2 an apparatus for testing the strength of a leaf spring contact 10 engaging a contact 11, and measuring the strength of the spring 10 at the point therein in which it is moved out of engagement with the contact 11. This apparatus includes a presser 14 including a handle 15 composed of electrical insulating material which has a bore 16 therein through which an electrical cord 17 extends. The handle 15 is provided with arms 18 and 19 to which a leaf spring feeler 20 is secured by clamps 21 screwed to the arms 18 and 19. The clamps 21 securely hold a transducer tube 22 of a well known type provided with an actuating pin 23 which is secured rigidly to the leaf spring feeler 20 in a cut out portion 25.

Terminals 28 of the tube 22 are connected to conductors 29 of the cord 17. The conductors 29 are connected to a balanced D. C. amplifier 32 supplied with power from an A. C. powerline 33. The output of the amplifier 32 is connected by conductors 34 and 35 to the contact 11 and one side of a capacitor 36, respectively. The other side of the capacitor 36 is connected by conductors 37 and 38 to the contact 10, and a D. C. vacuum tube voltmeter 42 is connected by conductors 43 and 44 to opposite sides of the capacitor 36.

Operation

In testing the strength of the contact 10 at the point at which it breaks contact with the contact 11, the handle 15 is grasped and the feeler 20 is pressed against the contact 10 until the engagement between the contact 10 and the contact 11 is broken. As the pressing is effected, the leaf spring feeler 20 is flexed, and it deflects the actuating rod 23 of the transducer tube 22, thereby causing the tube 22 to be more conductive. This actuates the D. C. amplifier 32 to raise the potential between the conductors 34 and 35 to charge the capacitor 36 to an extent proportional to the deflection of the actuating rod 23, which, in turn, is proportional to the force of the spring contact 10 reacting against the feeler 20. Then, as the engagement between the contacts 10 and 11 is broken, the condenser maintains the same potential on the voltmeter 42 as was impressed thereon as the engagement between the contacts 10 and 11 was broken, and the "breaking" strength of the contact 10 is indicated in grams by the voltmeter 42.

The above-described apparatus very effectively test contacts and are simple and inexpensive in construction and operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A presser for testing springs, which comprises a fork-shaped handle, a transducer tube having an actuating element, means mounting the transducer tube rigidly on the handle, and a leaf spring feeler extending beyond the arms of the handle and having arms secured to the arms of the handle, said actuating element of the tube being fastened to the feeler at a point thereon beyond the arms thereof.

2. An apparatus for measuring the force necessary to open a pair of normally closed electrical spring contacts, which comprises means for holding such a pair of contacts, balanced D. C. amplifier means having output leads and control leads, a condenser, means for connecting the contacts and the condenser in series to the output leads of the amplifier means, a resilient presser for pressing the contacts open, transducer means responsive to force on the presser from the contacts and connected to the control leads for actuating the amplifier means, and voltage-measuring means connected across the condenser for indicating the voltage across the condenser when the contacts are opened.

References Cited in the file of this patent

UNITED STATES PATENTS

| | | |
|---|---|---|
| 1,881,813 | Meglitz | Oct. 11, 1932 |
| 2,003,910 | Stephenson | June 4, 1935 |
| 2,272,921 | Paulson | Feb. 10, 1942 |
| 2,283,730 | Gardner | May 19, 1942 |
| 2,292,235 | McCarthy | Aug. 4, 1942 |
| 2,440,283 | Levy | Apr. 27, 1948 |
| 2,457,165 | McNamee | Dec. 28, 1948 |
| 2,577,805 | Pidduck | Dec. 11, 1951 |
| 2,626,523 | Pike | Jan. 27, 1953 |
| 2,661,623 | Brink | Dec. 8, 1953 |